Figure 1:
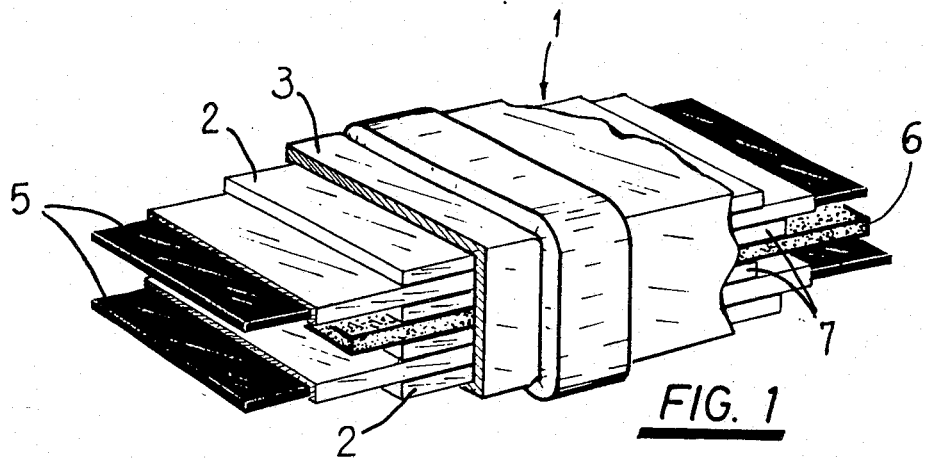

United States Patent [19]

Sant-Pont et al.

[11] Patent Number: 4,789,576

[45] Date of Patent: Dec. 6, 1988

[54] SUPPORTING BAR

[76] Inventors: José M. Sant-Pont, María Auxiliadora 23; Ramón Bigas-Balcells, Plaza Gironella 1, both of 08017 Barcelona, Spain

[21] Appl. No.: 930,569

[22] Filed: Nov. 14, 1986

[51] Int. Cl.⁴ .............................................. A47F 5/12
[52] U.S. Cl. .................................... 428/34.1; 428/55; 428/900; 428/35.7; 428/35.9; 428/36.91; 362/382; 362/398; 362/806; 403/DIG. 1; 248/309.4
[58] Field of Search ................ 428/55, 900, 36, 206.5, 428/309.4; 362/382, 389, 393, 398, 806; 403/DIG. 1

[56] References Cited

U.S. PATENT DOCUMENTS 3,319,061   5/1967   Pohl et al. .......................... 362/270
4,692,850   9/1987   Le Doux ............................. 362/432
4,693,767   9/1987   Grzanna et al. ..................... 428/36

Primary Examiner—John E. Kittle
Assistant Examiner—B. A. Bozzelli
Attorney, Agent, or Firm—Cushman, Darby & Cushman

[57] ABSTRACT

The supporting bar, which could serve as a supporting arm for an articulated table lamp, is constituted by a plurality of thin, flat straps of elastic material which are juxtaposed in close contact and held pressed together within an outer cover, with sufficient force that when the bar is flexed, the frictional forces from cover and strap to strap maintain the bent shape, against the elastic forces tending to restore the unbent shape of each strap. One of the straps can be made of magnetized material and the others of ferromagnetic material.

11 Claims, 2 Drawing Sheets

SUPPORTING BAR

The invention relates to a supporting bar able to undergo plastic deformations through flexion on one or several longitudinal planes.

It is the object of this invention to obtain an articulated support, constituted by a group of elastic elements qualified for supporting, without any apparent deformation, certain bending moment, from which the whole assembly behaves plastically.

Basicly, this articulable support, which is the object of this invention, fulfils the following characteristics:

It supports the moment of resulting force corresponding to any position.

Starting at the moment given by the aforementioned condition through a small increase of the bending moment it becomes plastically deformed and an excellent precision is obtained in the position in which it is left.

It resists at least 10.000 bending cycles at 180°, without losing its functional character, which means a guarantee of a minimum of 10 years perfect operation.

It maintains its static and dynamic properties with normal atmospherical variations.

Among many other possibilities of application for this supporting bar, which is the object of this invention, one of the most appropiate might be a supporting arm for an articulated table lamp.

Essentially, the supporting bar concerned is characterized by the fact that it is constituted of many thin and flat contiguous straps and they are juxtaposed longitudinally in very close contact, staying together parallelly like a package forming the bar with an external cover which provides an inward pressure uniformly distributed over the whole bar, all this in a way that in the rest position the whole assembly acts as a compact bar due to frictional forces existing between the straps, so that when submitted to a bending force applying a pair of forces in a manner that said frictional forces grow stronger between the contiguous straps, said straps by means of a sliding movement between each other permit the bending of the bar, said inward pressure to the cover is of such magnitude, that when ceasing this bending effort, frictional forces among the straps are stronger than the elastic pair of recovery produced by the proper elasticity of the material which the straps are made of, by means of which the bar remains deformed following a plastic performance.

As to another characteristic of this invention, all straps forming the bar can be joined advantageously and inseparably through one of the ends.

According to another characteristic of this invention, at least two of the straps of the group can be advantageously constituted of an electricity conducting material.

As to another characteristic of this invention, the bar contains at least one intermediate strap permanently magnetized, next to the respective straps of iron material.

The attached drawings show, in an unlimited example, two manners of realization of the supporting bar, object of the present invention.

Figure 2:
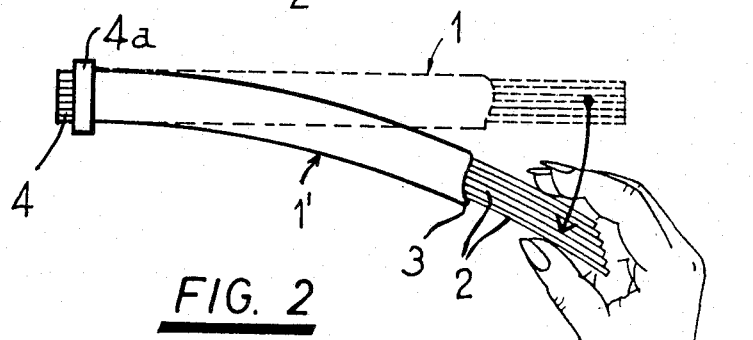
Figure 3:
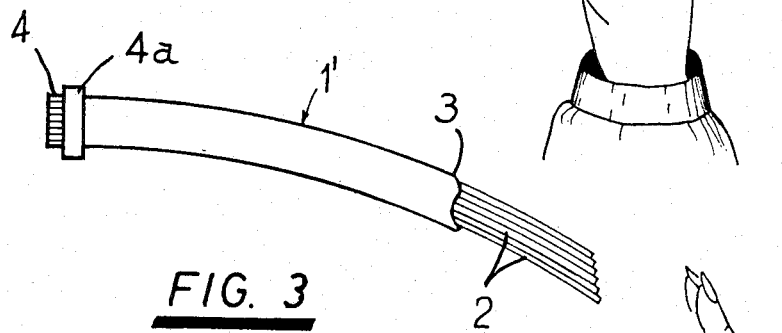
Figure 4:
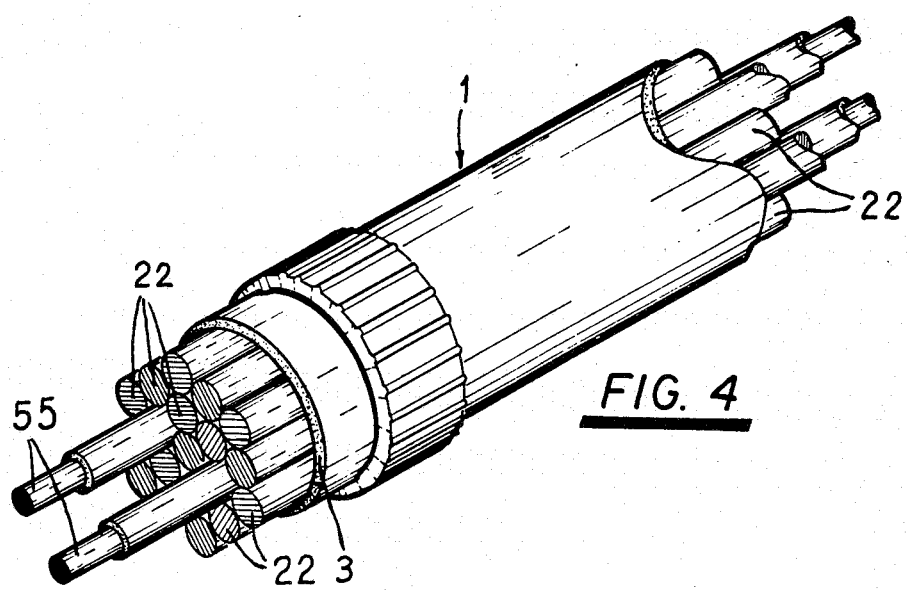

FIG. 1 shows a perspective view of a part of the supporting bar, according to a first way of realization of the invention, and FIGS. 2 and 3 show both views with a side view, in a smaller scale, of an application of a bar of FIG. 1 invention with one of its fixed ends and FIG. 4 shows a similar view to that of FIG. 1 of a second way of realization of the invention.

In FIGS. 1, 2 and 3 of the drawings you can appreciate that the supporting bar includes many thin and flat contiguous straps with a similar or equal cross section, juxtaposed longitudinally in a very close contact and staying together in a parallel package forming the bar by an external cover 3 which provides an inward pressure distributed in an uniform manner over the whole bar 1.

It is evident, eventhough in FIG. 1 all straps 2 have sensibly the same cross section, it would be possible to make a bar 1 with strap 2 of sensibly different cross sections. It is also evident that the shape with rectangular cross section of the bar 1 is definitely not the only one which can be obtained by the supporting bar, object of the present invention.

In rest position the whole assembly acts like a compact bar 1, due to the frictional forces existing between the straps 2. But when bar 1 is submitted to bending force, as indicated by an arrow in FIG. 2, applying a pair of forces represented here by the end 4 which is inmobile and by the hand of the user which acts at the other end of bar 1, so that said frictional forces grow among the contiguous straps 2, said straps 2 by a sliding movement between each other permit the bending of bar 1 upto position 1' for instance, the inward pressure the cover 3 being of such magnitude that, when ceasing this bending effort (FIG. 3), the frictional force among the straps 2 is greater than the elastic pair of recovery produced by the proper elasticity of the material from which the straps 2 are made. Under these circumstances, bar 1 remains deformed following a plastic performance.

All straps 2 constituting bar 1 can be joined advantageously and inseparably by a band 4a at one of its ends 4 (FIG. 2 and 3).

Apart from this, at least two straps 5 which are a part of bar 1, can be constituted advantageously by an electricity conducting material.

If friction among the straps should be increased, an intermediate strap 6 which is permanently magnetized can be placed between the respective iron straps 7.

FIG. 4 shows another possibility of realization of bar 1, object of this invention, where bar 1 includes many thin contiguous rods 22, with a similar or equal section, from which at least two bars 55 can be constituted by an electricity conducting material. The same as in the realization of FIGS. 1, 2 and 3, the bars 22 and 55 are packed with a cover 3 which provides an inward pressure uniformly distributed over the whole bar 1.

It is assumed that all that does alter, change or modify the essential part of the supporting bar described, can be submitted to variation in details.

We claim:

1. Supporting bar, capable of undergoing plastic deformations through flexing so that its longitudinal axis remains in longitudinal plane, perpendicular to the greatest dimension of the bar's end, characterized by the fact that the bar is constituted of many thin and flat contiguous straps which are juxtaposed longitudinally, staying together, in a package forming the bar by an external cover which provides an inward pressure uniformly distributed over the whole bar, in such a way that in the rest position, the whole assembly acts as a compact bar due to frictional forces existing between the straps, so that when applying a pair of forces essentially in perpendicular sense to the greatest dimension of the end of the bar, in a way that said frictional forces become stronger between the contiguous straps, said straps by means of a sliding movement between each other permit the flexing of the bar, the inward pressure of the cover being of such magnitude that, when ceasing this bending effort, frictional forces between the straps are stronger than the elastic pair of recovery produced by the elasticity of the material which the straps are made of, be means of which the bar remains deformed following a plastic deformation.

2. Supporting bar as in claim 1, characterized by the fact that all the straps that constitute said bar are joined together inseparably at one end of the bar.

3. Supporting bar as in claim 1, characterized by the fact that at least two of the straps which form said bar are constructed of electricity conducting material.

4. Supporting bar as in claim 1, characterized by the fact that said bar contains at least one intermediate strap of permanently magnetized material, next to a strap of iron material.

5. Supporting bar, capable of undergoing plastic deformations through flexing about one or several longitudinal planes, characterized by the fact that the bar is constituted of many thin contiguous rods, of similar or equal cross section, longitudinally juxtaposed in very close contact, staying together parallelly forming the bar with an external cover which provides an inward pressure uniformly distributed over the whole bar, in such a way that in the rest position said supporting bar acts as a compact bar due to the frictional forces existing between the rods, so that when submitted to a bending force, applying a pair of forces, in a manner that said frictional forces grow stronger between the contiguous rods, said rods by means of a sliding movement between each other permit the flexing of the bar, the inward pressure of the cover being of such magnitude that when ceasing said bending effort, frictional forces among the rods are stronger than the elastic recovery by the elasticity of the material which the rods are made of, by means of which the bar remains deformed following a plastic performance.

6. Supporting bar as in claim 5, wherein all rods which constitute said bar are jointed together inseparably at one end of the bar.

7. Supporting bar as in claim 5, characterized by the fact that at least two of the rods which form said bar are constructed of electrically conducting material.

8. An elongated bar suitable for use as a support which can undergo plastic deformation when subjected to a bending force, said bar comprising a plurality of elongated bar elements arranged side-by-side, said bar elements being elastically deformable by bending forces applied thereto and an external cover surrounding said bar elements and applying thereto an inward force which places said bar elements in frictional contact with each other whereby the friction forces between the bar elements impart stiffness to said bar, the relationship between the frictional forces acting between contiguous bar elements and the elasticity of said bar elements being such that application of a bending force to said bar causes sliding movement between contiguous bar elements thus permitting said bar to flex, said frictional forces being stronger than the forces of elastic recovery of said bar elements whereby said bar remains flexed upon release of said bending force.

9. A bar as in claim 8 wherein said bar elements are thin, flat straps.

10. A bar as in claim 8 wherein said bar elements are rods.

11. A bar as in claim 8 wherein at least two of said bar elements are made of iron.

* * * * *